July 2, 1929.  E. A. BAKER  1,719,746
NONSKID FLEXIBLE TRACTION SHOE
Filed May 1, 1928

Inventor
Edward A. Baker
By John N. Goss
Leo Attorney

Patented July 2, 1929.

1,719,746

UNITED STATES PATENT OFFICE.

EDWARD A. BAKER, OF MANSFIELD, OHIO.

NONSKID FLEXIBLE TRACTION SHOE.

Application filed May 1, 1928. Serial No. 274,261.

This invention relates to a nonskid flexible traction shoe.

The primary object of the invention is to provide a flexible shoe which is constructed of alternate layers of fabric and rubber and to provide in the layers a plurality of spaced apart apertures to receive a plurality of calks and to hold and secure the calks on the shoe in pre-determined spaced apart positions in preparatory to and for the purpose of subjecting the layers of material to the well-known process of vulcanizing such as is used in the manufacture of pneumatic tires or the like.

A further object is to provide a flexible non-skid shoe that is adapted to yield or flex in the same manner and with the same resiliency as the pneumatic tire to which it is attached.

A further object is to provide an anti-skid shoe with means that are especially adapted to prevent skidding or slipping on icy or muddy surfaces of pavements or the like and to provide means for adjustably clamping the shoe to a pneumatic tire.

These and other objects are attained by the mechanism illustrated in the accompanying drawing in which:—

Figure 1:
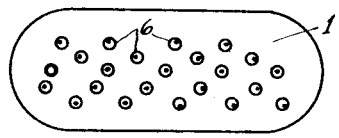
Fig. 1 represents a plan view of the shoe showing a plurality of calks secured thereto in pre-determined spaced relation to each other.
Figure 2:
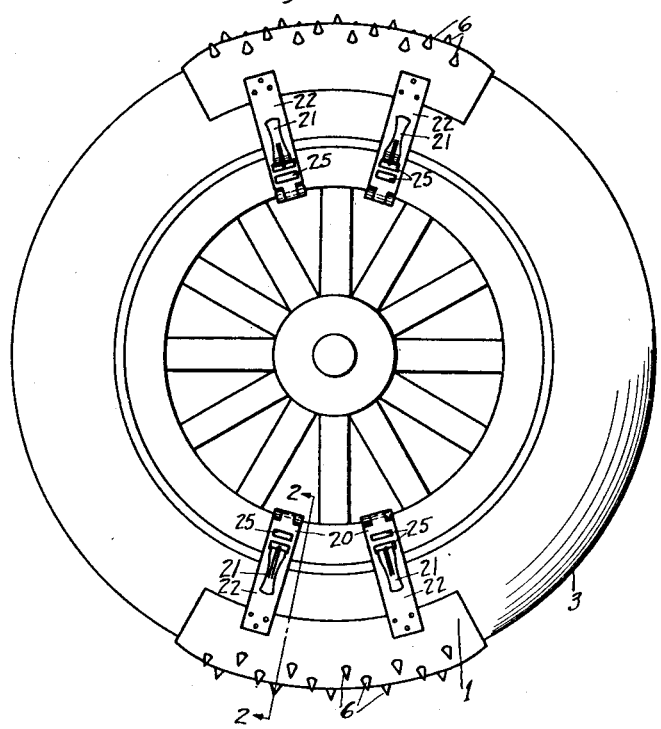
Fig. 2 is a side elevation of a wheel having a tire mounted thereon showing two shoes clamped in opposed relation to the periphery of the tire.
Figures 3, 4:
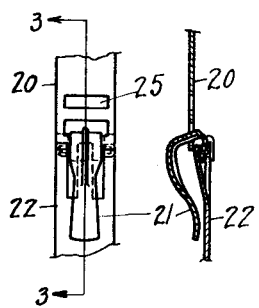
Fig. 3 is a plan view of a snap buckle which is used to fasten the clamping means around the felly of the wheel and the periphery of the tire.
Fig. 4 is a sectional view of the snap buckle taken on the line 3—3 of Fig. 3.
Figure 5:
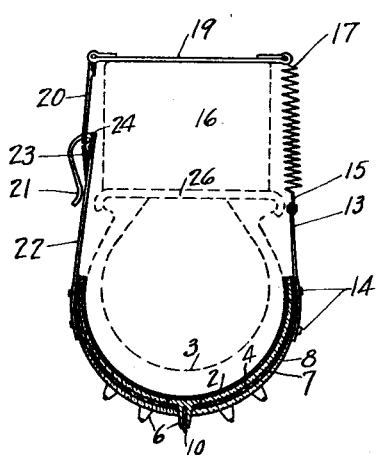
Fig. 5 is a cross sectional view of the shoe and clamping mechanism, also showing a diagrammatic view of the felly and rim on the line 2—2 of Fig. 2.
Figure 6:
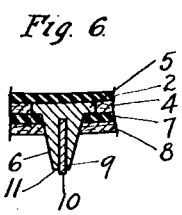
Fig. 6 is a sectional view of one of the calks showing alternate layers of fabric and rubber and the position of the calks interposed between the fabric and rubber preparatory to and during the vulcanizing process to secure the calks to the shoe.

The method of constructing the flexible shoe, and securing a plurality of calks thereto by the vulcanizing process is as follows: A layer of rubber 2 is used for the first layer of the series of plies forming the shoe and is adapted to lie in contact with the periphery of the tire 3. The second layer is made of fabric as indicated by reference numeral 4 and is provided with a plurality of apertures to receive the flanges 5 of a plurality of calks 6. A second layer of rubber as indicated at 7 is provided with apertures which register with apertures formed in the fabric 4 and is applied on and over the fabric 4. A second layer of fabric 8 having apertures provided therein that register with the apertures provided in the layers of rubber 2 and 7 and the layer of the fabric 4 is then applied to and on and over the rubber 7. Before the calks 6 are inserted between the layers of rubber and fabric, pins 9 made of comparatively harder metal than the metal used in making the calks are fitted within central apertures formed in the pointed ends of the calks 6 preferably leaving the free ends 10 thereof extending beyond the ends 11 of the calks.

In order to firmly and securely vulcanize the calks to the flexible body portion of the shoe, the shoe is placed upon a conventional core and a mold is provided to cover the shoe leaving the shoe interposed between the core and mold. The core, having a shoe or shoes thereon and the mold are then placed into a vat or tank and subjected to a process of vulcanizing such as used in the manufacture and production of pneumatic tires which is well known in the art. When the shoes have been vulcanized as stated, the calks are held rigidly and securely thereon in their pre-determined positions and in spaced apart relation from each other.

When the shoe has been vulcanized and molded to proper shape with the calks secured thereto, means are provided and secured to the shoe for clamping the shoe to the periphery of the tire. The preferable means for clamping the shoe to the tire is constructed as follows:

A link 13 is attached to one side of the shoe by rivets 14 or the like at one end and its opposite end is attached to the end of a spring 15. The spring extends inwardly to substantially the width of the felly 16. The opposite end of the spring 17 is attached to a link 19 which is adapted to lie across the surface of the felly 16 slightly under tension. The link 19 is pivotally connected to a slotted plate 20 which forms part of a buckle which adjustably engages swinging hook 21 of the other part of a snapper buckle which is pivotally attached to a plate 22. The hook 21 is held in place by a spring tongue 23 which, when the hook is in closed position, constantly exerts a tension on the heel 24 of the hook 21, thereby holding the snapper buckle in yielding locked position.

The hook of the snapper buckle can be adjusted on the slotted plate for regulating the clamping means for securing the shoe on the tire by inserting same in one of the series of slots 25. The link 19 as stated is normally under a tension and when placed in contact with a felly is adapted to expand the spring, taking up the lost motion of the clamping mechanism. The rim of the wheel is indicated by reference numeral 26.

Attention is called to the fact that in vulcanizing the calks, as described, two or more plies or layers of fabric with rubber interposed therebetween can be used if desired. It will further be noted that one or a plurality of shoes can be attached to each tire as desired.

It will be further observed that the shoe can be quickly, rapidly, and conveniently attached to or detached from a tire without soiling the clothes of the user and further it is not necessary to use a jack or the like to lift the car in placing upon or removing the shoe from the tire.

I claim:

A flexible non-skid shoe for tires, comprising a body wholly separable from the tire and designed to be removably secured thereto, said body being made of alternate layers of rubber and fabric, the innermost layer being of rubber to bear on the tire, a headed stud held within the layers outwardly beyond the innermost layer, the head of the stud seating in an opening in and being of a thickness commensurate with that of one of the fabric layers, there being fabric and rubber layers outwardly beyond the head of the stud and embracing said stud, the layers of the body being vulcanized to present an integral unit.

In testimony whereof I affix my signature.

EDWARD A. BAKER.